(12) United States Patent
Ahuja et al.

(10) Patent No.: US 12,476,885 B2
(45) Date of Patent: Nov. 18, 2025

(54) SYSTEM AND METHOD FOR CREATING A CUSTOM RELATIONSHIP BETWEEN SERVICE SPECIFICATIONS

(71) Applicant: Rakuten Mobile, Inc., Tokyo (JP)

(72) Inventors: Rajasi Ahuja, Tokyo (JP); Abhishek Pawankumar Sharma, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/250,353

(22) PCT Filed: Dec. 21, 2022

(86) PCT No.: PCT/US2022/053657
§ 371 (c)(1),
(2) Date: Apr. 24, 2023

(87) PCT Pub. No.: WO2024/136859
PCT Pub. Date: Jun. 27, 2024

(65) Prior Publication Data
US 2025/0080434 A1    Mar. 6, 2025

(51) Int. Cl.
*H04L 41/5051* (2022.01)
*H04L 41/5054* (2022.01)

(52) U.S. Cl.
CPC ...... *H04L 41/5051* (2013.01); *H04L 41/5054* (2013.01)

(58) Field of Classification Search
CPC ......................... H04L 41/5051; H04L 41/5054
See application file for complete search history.

(56) References Cited

U.S. PATENT DOCUMENTS

| | | | | |
|---|---|---|---|---|
| 2009/0157457 | A1* | 6/2009 | Huuhtanen | ......... H04L 41/5054 705/26.1 |
| 2017/0250870 | A1* | 8/2017 | Zhao | ....................... H04L 63/20 |

* cited by examiner

*Primary Examiner* — Joe Chacko
(74) *Attorney, Agent, or Firm* — HAUPTMAN HAM, LLP

(57) ABSTRACT

A method includes receiving a unilateral relationship between a first service specification and a second service specification; receiving a complimentary relationship between the second service specification and the first service specification; storing each relationship in a relationship table included in a service catalog; receiving a payload corresponding to the first service specification, where the payload includes a service specification relationship with the second service specification; verifying the service specification relationship in the payload correlates with the unilateral relationship stored in the relationship table; in response to the service specification relationship in the payload correlating with the unilateral relationship stored in the relationship table, verifying whether the complimentary relationship exists in the relationship table; and in response to the complimentary relationship existing in the relationship table, updating automatically a service corresponding to the second service specification with a service specification relationship with the first service specification.

20 Claims, 8 Drawing Sheets

SYSTEM AND METHOD FOR CREATING A CUSTOM RELATIONSHIP BETWEEN SERVICE SPECIFICATIONS

RELATED APPLICATIONS

The present application is a National Phase of International Application No. PCT/US2022/053657, filed Dec. 21, 2022.

TECHNICAL FIELD

This description relates to a system for creating a custom relationship between service specifications and method of using the same.

BACKGROUND

A cellular network is a telecommunication system of mobile devices (e.g., mobile phone devices) that communicate by radio waves through one or more local antenna at a cellular base station (e.g., cell tower). Cellular service is provided to coverage areas that are divided into small geographical areas called cells. Each cell is served by a separate low-power-multichannel transceiver and antenna at the cell tower. Mobile devices within a cell communicate through that cell's antenna on multiple frequencies and on separate frequency channels assigned by the base station from a pool of frequencies used by the cellular network.

A radio access network (RAN) is part of the telecommunication system and implements radio access technology. RANs reside between a device, such as a mobile phone, a computer, or remotely controlled machine, and provides connection with a core network (CN). Depending on the standard, mobile phones and other wireless connected devices are varyingly known as user equipment (UE), terminal equipment (TE), mobile station (MS), and the like.

SUMMARY

In some embodiments, a method includes receiving, by a processor, a unilateral relationship between a first service specification and a second service specification; receiving, by the processor, a complimentary relationship between the second service specification and the first service specification; storing, by the processor, each relationship in a relationship table included in a service catalog; receiving, by the processor, a payload corresponding to the first service specification, where the payload includes a service specification relationship with the second service specification; verifying, by the processor, the service specification relationship in the payload correlates with the unilateral relationship stored in the relationship table; in response to the service specification relationship in the payload correlating with the unilateral relationship stored in the relationship table, verifying, by the processor, whether the complimentary relationship exists in the relationship table; and in response to the complimentary relationship existing in the relationship table, updating automatically, by the processor, a service corresponding to the second service specification with a service specification relationship with the first service specification.

In some embodiments, an apparatus incudes a processor; and a memory having instructions stored thereon that, in response to being executed by the processor, cause the apparatus to receive a unilateral relationship between a first service specification and a second service specification; receive a complimentary relationship between the second service specification and the first service specification; store each relationship in a relationship table included in a service catalog; receive, from a user, a payload corresponding to the first service specification, where the payload includes a service specification relationship with the second service specification; verify, by an application, the service specification relationship in the payload correlates with the unilateral relationship stored in the relationship table; in response to the service specification relationship in the payload correlating to the unilateral relationship stored in the relationship table, verify, by the application, whether the complimentary relationship exists in the relationship table; and in response to the complimentary relationship existing in the relationship table, automatically update a service corresponding to the second service specification with the service specification relationship with the first service specification.

In some embodiments, a non-transitory computer readable medium having instructions stored thereon that, in response to being executed by a processor, cause an apparatus to receive a unilateral relationship between a first service specification and a second service specification; receive a complimentary relationship between the second service specification and the first service specification; store each relationship in a relationship table included in a service catalog; receive a payload corresponding to the first service specification, where the payload includes a service specification relationship with the second service specification; verify the service specification relationship in the payload correlates with the unilateral relationship; in response to the service specification relationship in the payload correlating with the unilateral relationship stored in the relationship table, verify whether the complimentary relationship between exists in the relationship table; and in response to the complimentary relationship existing in the relationship table, automatically update a service corresponding to the second service specification with the service specification relationship with the first service specification.

BRIEF DESCRIPTION OF THE DRAWINGS

Aspects of the present disclosure are understood from the following detailed description when read with the accompanying Figures. In accordance with the standard practice in the industry, various features are not drawn to scale. In some embodiments, dimensions of the various features are arbitrarily increased or reduced for clarity of discussion.

DETAILED DESCRIPTION

Figure 1:
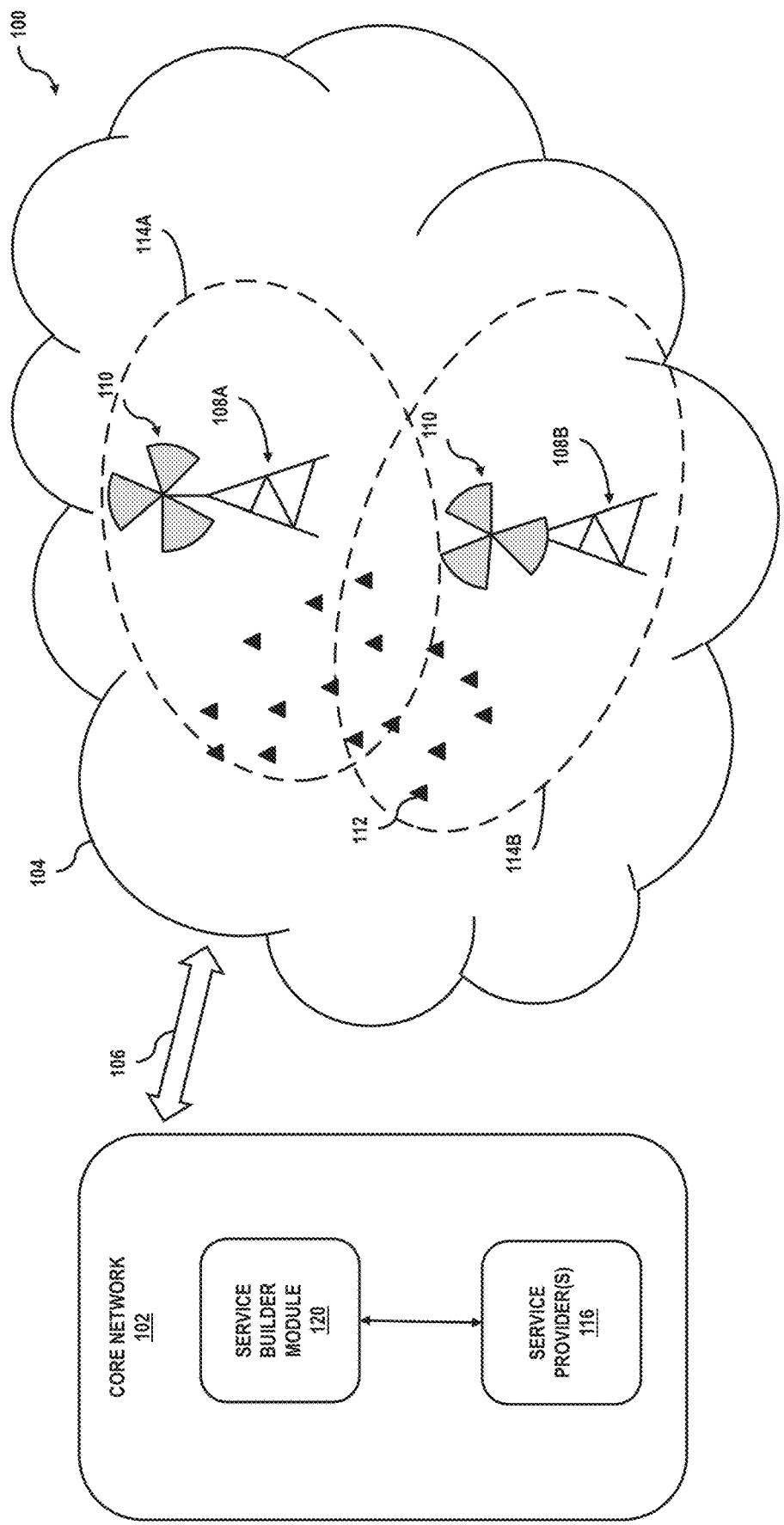
FIG. 1 is a diagrammatic representation of a system for network slice design (NSD), in accordance with some embodiments.

The following disclosure provides many different embodiments, or examples, for implementing distinctive features of the discussed subject matter. Examples of components, values, operations, materials, arrangements, or the like, are described below to simplify the embodiments. These are, of course, examples and are unintended to be limiting. Other components, values, operations, materials, arrangements, or the like, are contemplated. For example, the formation of a first feature over or on a second feature in the description that follows include embodiments in which the first and second features are formed in direct contact, and further include embodiments in which additional features are formed between the first and second features, such that the first and second features are unable to be in direct contact. In addition, some embodiments repeat reference numerals and/or letters in the numerous examples. This repetition is for the purpose of simplicity and clarity and is unintended to dictate a relationship between the various embodiments and/or configurations discussed.

Further, spatially relative terms, such as beneath, below, lower, above, upper and the like, are used herein for ease of description to describe one element or feature's relationship to another element(s) or feature(s) as illustrated in the Figures. The spatially relative terms are intended to encompass different orientations of the device in use or operation in addition to the orientation depicted in the Figures. The apparatus is able to be otherwise oriented (rotated 90 degrees or at other orientations) and the spatially relative descriptors used herein likewise are interpreted accordingly.

A network service (NS) bundle is a bundle which includes technology services, configuration, manifest files, or other suitable services and files within the scope of some embodiments. The technology services are further subdivided into different network service descriptors (NSDs) and virtualized network function descriptors (VNFDs). The VNFDs are created with application bundles.

An application bundle file is a single, relocatable file that contains the artifacts to execute an application. An application bundle file is set to run on an instance (or instantiation). Application files are relocated by moving the application bundle file. Except for system libraries, the application bundle file includes toolkit artifacts that are used to execute the application. The application does not access external toolkits when running on execution hosts (e.g., a smartphone used by a subscriber). Logically, an application bundle file includes parts of the application directory and the output directory, plus subdirectories from toolkits that contributed to the application. When an application bundle file is submitted for execution, the application bundle file is deployed to all hosts on which the application runs. The application bundle file is then unbundled into a runtime application directory hierarchy that is similar to a compile-time hierarchy with the addition of any external toolkit entities. An application bundle file has an identifier that uniquely distinguishes one build of an application from another. When an application bundle file is submitted for execution, the identifier is used to check whether there is another instance of the same application already running, and in response to their being one, the identifier shares the unbundled execution location. In this case, the same runtime application directory hierarchy is used for executions of a given application bundle file.

A NSD is a deployment template which includes information used by a network function virtualization orchestrator (NFVO) for life cycle management of a network service (NS). An NS is a composition of network functions (NFs or applications) arranged as a set of functions with unspecified connectivity between the NFs or according to one or more forwarding graphs.

A network slice (a portion of the original network architecture that is divided or sliced into multiple logical and independent networks that are configured to effectively meet the diverse services requirements) is broken up into subnets where each subnet is dedicated to a specific domain (e.g., RAN, CN, transport domain, or end-to-end (E2E) that includes each). The transport domain references the telecommunication transmission facilities under which voice, data, and video communications are distributed between distant locations for use on a shared basis.

Within a subnet is one or more NSs or a bundle of NSs. Within a NS is one or more NFs or a bundle of NFs. An application bundle (e.g., a bundle containing the executable code of an application and associated resources) is registered at an orchestrator bundle catalog (orchestration is the automated configuration, coordination, and management of computer systems and software). An onboarding service creates the bundle/package objects in a central inventory. The onboarding service sends a request to a policy manager for creating the policy descriptor files (without source element universally unique identifiers (UUIDs), which are 128-bit labels used for information in computer systems).

When generated according to the standard methods, UUIDs are, for practical purposes, unique. Their uniqueness does not depend on a central registration authority or coordination between the parties generating them, unlike most other numbering schemes. While the probability that a UUID is duplicated is not zero, the probability is close enough to zero to be negligible. Thus, a UUID is created by anyone and used to identify something with near certainty that the identifier does not duplicate one that has already been, or is, created to identify something else. Information labelled with UUIDs by independent parties therefore is later combined into a single database or transmitted on the same channel, with a negligible probability of duplication.

A policy manager determines the degree to which a service/device is allowed to do what the service/device is attempting/requesting (decision) and is then able to enforce the decision (enforcement). Some examples of policies include (1) is the customer allowed to use this service, (2) is there enough capacity to support this new service, (3) what happens to non-SLA (service level agreement) customers when a node approaches congestion, and (4) is the service request/activity a security threat?

The policy manager sends back a policy ID to the orchestrator and the orchestrator stores the policy ID with the package ID. A NF instantiation request is received from a user (e.g., instantiate a NF using a NFT (network function template) which includes a policy descriptor file with policy ID).

The instance is created in a central inventory. The orchestrator deploys the NF/application and sends notification to the policy manager for enabling the policies with respective policy IDs. The policy files are modified with pending (source element UUID or the like) information. After modifying the pending information, the descriptor is referenced as policy template. Now the policy template is ready for activation by a user.

In some embodiments, a system and method for adding valid custom relationships between service specifications by a service catalog is discussed. A service catalog is an organized and curated collection of any business and information technology (IT) related services that are performed by, for, or within an enterprise. Service catalogs act as knowledge management tools for the employees and consultants of an enterprise, allowing requests routing for and about services and service-related topics to the subject matter experts who own, are accountable for, and operate the services and service-related topics. Each service within such service catalogs is usually very repeatable and has controlled inputs, processes, and outputs.

In some embodiments, a feature to allow valid relationships to be created from a user interface (UI) ensures service specifications comply with a valid set of relationships and are unable to be associated using an incorrect random relationship. In some embodiments, a provision allows user-defined relationships so that a user links one service specification to another with the user's defined relationship.

In other approaches, in response to a new relationship being formed between service specifications, a change in the database is called for so the service catalog application identifies the new relationship as valid. This process is time-consuming.

In some embodiments, to reduce inefficiencies through time-consuming processes, a feature is introduced that allows an authorized user to directly add a relationship to the service catalog such that the service catalog identifies the relationship as valid. This feature allows description of the valid relationships of two service specifications. In some embodiments, a new application programming interface (API) is added to enable users the ability to define these relationships. In this way, once the relationship is described via the API, the relationship is then used to link service specifications during a POST call.

In computing, POST is a request method supported by HTTP used by the World Wide Web (WWW). By design, the POST request method requests that a web server accept the data enclosed in the body of the request message, for storing. Post is often used when uploading a file or when submitting a completed web form. As part of a POST request, an arbitrary amount of data of any type is sent to the server in the body of the request message. A header field in the POST request usually indicates the message body's Internet media type.

An API is a way for two or more computer programs to communicate with each other. API is a type of software interface, offering a service to other pieces of software. In contrast to a user interface, which connects a computer to a person, an API connects computers or pieces of software to each other.

In some embodiments, the format of the POST API call is as follows:

{serviceSpecification role:
relationshipType:
targetServiceSpecification role:}

In some embodiments, a relationship between two service specifications and the role each one has in the relationship are registered at the service catalog. In some embodiments, in response to making a POST API call to register the service specification, the user uses this relationship. In a non-limiting example, a user registers a complimentary relationship which any two service specifications are configured to have.

In some embodiments, the registered relationships simplify processes, reduce overload on product and delivery teams, increases efficiency, and even non-technical users are able to use the registered relationships to solve business problems related to mapping two service specifications.

In some embodiments, the ability to add valid relationships from a UI provides a useful feature in comparison to other approaches. In some embodiments, a provision to allow user defined relationships so that a user links a service specification to another service specification with the user's defined relationship is beneficial and saves labor overhead.

In some embodiments, a feature allows a user to describe valid relationships between two service specifications. In some embodiments, a new API is added to enable users to define these relationships. In some embodiments, once a relationship is described via this API, the relationship is then configured to be used to link service specifications during a POST call.

In some embodiments, a relationship between two service specifications and a role each service specification has in the relationship are registered on a service catalog and the user uses this relationship when making a POST API call to register the service specification with the tele-management forum (TMF).

TMF is a global industry association for service providers and suppliers in the telecommunications industry. Members include communications and digital service providers, telephone companies, cable operators, network operators, cloud providers, digital infrastructure providers, software suppliers, equipment suppliers, systems integrators, and management consultancies.

In some embodiments, a user registers a complimentary relationship between two or more service specifications. In some embodiments, two API calls are made to register the complimentary relationship between two or more service specifications with a service catalog. In a first POST API Call, a service specification role is called out (e.g., a supplier), relationship type is called out (e.g., supplies to), and a target service specification role (e.g., dependent). In a second POST API Call, a service specification role is called out (e.g., dependent), a relationship type is called out (e.g., depends on), and a target service specification role is called out (e.g., supplier). In some embodiments, the two relationships are added in a separate table maintained for storing relationships and considered valid by the service catalog. In some embodiments, valid relationships are stored in the service specification relationship data table as follows: (1) in response to a valid relationship being registered with the service catalog, then a payload in one or more registered relationship service specifications is further valid. (2) in response to a complimentary relationship existing (e.g., registered with the service catalog), then a complimentary relationship exists further with the TMF. (3) the dependent service is updated with supplier service payload details. (4) the user stores an updated service specification including a new payload along with making the user-defined relationship to another service specification with the payload details.

FIG. 1 is a diagrammatic representation of a system for network slice design (NSD) 100, in accordance with some embodiments.

NSD system 100 includes a CN 102 communicatively connected to RAN 104 through transport network 106, which is communicatively connected to base stations 108A and 108B (hereinafter base station 108), with antennas 110 that are wirelessly connected to UEs 112 located in geographic coverage cells 114A and 114B (hereinafter geographic coverage cells 114). CN 102 includes one or more service provider(s) 116, KPI servers 118, and service builder module 120.

CN 102 (further known as a backbone) is a part of a computer network which interconnects networks, providing a path for the exchange of information between different local area networks (LANs) or subnetworks. In some embodiments, CN 102 ties together diverse networks over wide geographic areas, in different buildings in a campus environment, or in the same building.

In some embodiments, RAN 104 is a global system for mobile communications (GSM) RAN, a GSM/EDGE RAN, a universal mobile telecommunications system (UMTS) RAN (UTRAN), an evolved UMTS terrestrial radio access network (E-UTRAN), open RAN (O-RAN), or cloud-RAN (C-RAN). RAN 104 resides between UE 112 (e.g., mobile phone, a computer, or any remotely controlled machine) and CN 102. In some embodiments, RAN 104 is a C-RAN for purposes of simplified representation and discussion. In some embodiments, base band units (BBU) replace the C-RAN.

In a hierarchical telecommunications network, transport network 106 of NSD system 100 includes the intermediate link(s) between CN 102 and RAN 104. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul refers to the side of the network that communicates with the Internet. The connection between base station 108 and UE 112 begins with transport network 106 connected to CN 102. In some embodiments, transport network 106 includes wired, fiber optic, and wireless components. Wireless sections include using microwave bands, mesh, and edge network topologies that use high-capacity wireless channels to get packets to the microwave or fiber links.

In some embodiments, base stations 108 are lattice or self-supported towers, guyed towers, monopole towers, and concealed towers (e.g., towers designed to resemble trees, cacti, water towers, signs, light standards, and other types of structures). In some embodiments, base stations 108 are a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers (transceivers), digital signal processors, control electronics, a remote radio head (RRH), primary and backup electrical power sources, and sheltering. Base stations are known by other names such as base transceiver station, mobile phone mast, or cell tower. In some embodiments, other edge devices are configured to wirelessly communicate with UEs. The edge device provides an entry point into service provider CNs, such as CN 102. Examples include routers, routing switches, integrated access devices (IADs), multiplexers, and a variety of metropolitan area network (MAN) and wide area network (WAN) access devices.

In at least one embodiment, antenna(s) 110 are a sector antenna. In some embodiments, antenna(s) 110 are a type of directional microwave antenna with a sector-shaped radiation pattern. In some embodiments, the sector degrees of arc are 60°, 90°, or 120° designs with a few degrees extra to ensure overlap. Further, sector antennas are mounted in multiples when wider coverage or a full-circle coverage is desired. In some embodiments, antenna(s) 110 are a rectangular antenna, sometimes called a panel antenna or radio antenna, used to transmit and receive waves or data between mobile devices or other devices and a base station. In some embodiments, antenna(s) 110 are circular antennas. In some embodiments, antenna 110 operates at microwave or ultra-high frequency (UHF) frequencies (300 MHz to 3 GHz). In other examples, antenna(s) 110 are chosen for their size and directional properties. In some embodiments, the antenna(s) 110 are MIMO (multiple-input, multiple-output) antennas that send and receive greater than one data signal simultaneously over the same radio channel by exploiting multipath propagation.

In some embodiments, UEs 112 are a computer or computing system. Additionally, or alternatively, UEs 112 have a liquid crystal display (LCD), light-emitting diode (LED) or organic light-emitting diode (OLED) screen interface, such as user interface (UI) 822 (FIG. 8), providing a touchscreen interface with digital buttons and keyboard or physical buttons along with a physical keyboard. In some embodiments, UE 112 connects to the Internet and inter-connects with other devices. Additionally, or alternatively, UE 112 incorporates integrated cameras, the ability to place and receive voice and video telephone calls, video games, and Global Positioning System (GPS) capabilities. Additionally, or alternatively, UEs run operating systems (OS) that allow third-party apps specialized for capabilities to be installed and run. In some embodiments, UEs 112 are a computer (such as a tablet computer, netbook, digital media player, digital assistant, graphing calculator, handheld game console, handheld personal computer (PC), laptop, mobile Internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In some embodiments, geographic coverage cells 114 include a shape and size. In some embodiments, geographic coverage cells 114 are a macro-cell (covering 1 Km-30 Km), a micro-cell (covering 200 m-2 Km), or a pico-cell (covering 4 m-200 m). In some embodiments, geographic coverage cells are circular, oval (FIG. 1), sector, or lobed in shape, but geographic coverage cells 114 are configured in most any shape or size. Geographic coverage cells 114 represent the geographic area antenna 110 and UEs 112 are configured to communicate.

Service provider(s) 116 or CSPs are businesses, vendors, customers, or organizations that sell bandwidth or network access to subscribers (utilizing UEs) by providing direct Internet backbone access to Internet service providers and usually access to network access points (NAPs). Service providers are sometimes referred to as backbone providers, Internet providers, or vendors. Service providers include telecommunications companies, data carriers, wireless communications providers, Internet service providers, and cable television operators offering high-speed Internet access.

In some embodiments, service builder module 120 is configured to allow a user to design one or more network slices. In some embodiments, the network slice design is GUI based. In some embodiments, operations include a user inputting basic information such as, network slice name, slice type, domains, and shared or non-shared slice selection. Other operations include defining a slice such as, NS profile parameters (holds the original requirement of communication-service-instance, such as latency, data-rate, and mobility-level) requested by a northbound interface (e.g., internal to the system or manually from a user) and conversion of NS profile parameters to slice profile parameters (holds the slice sub-net parameter info of different network domain slice subnet instances (NSSIs), such as RAN, transport network (TN), and CN NSSI).

In some embodiments, service builder module 120 is configured to unify policy onboarding, such as a network function/network services (NF)/(NS) package onboarding.

Figure 2:
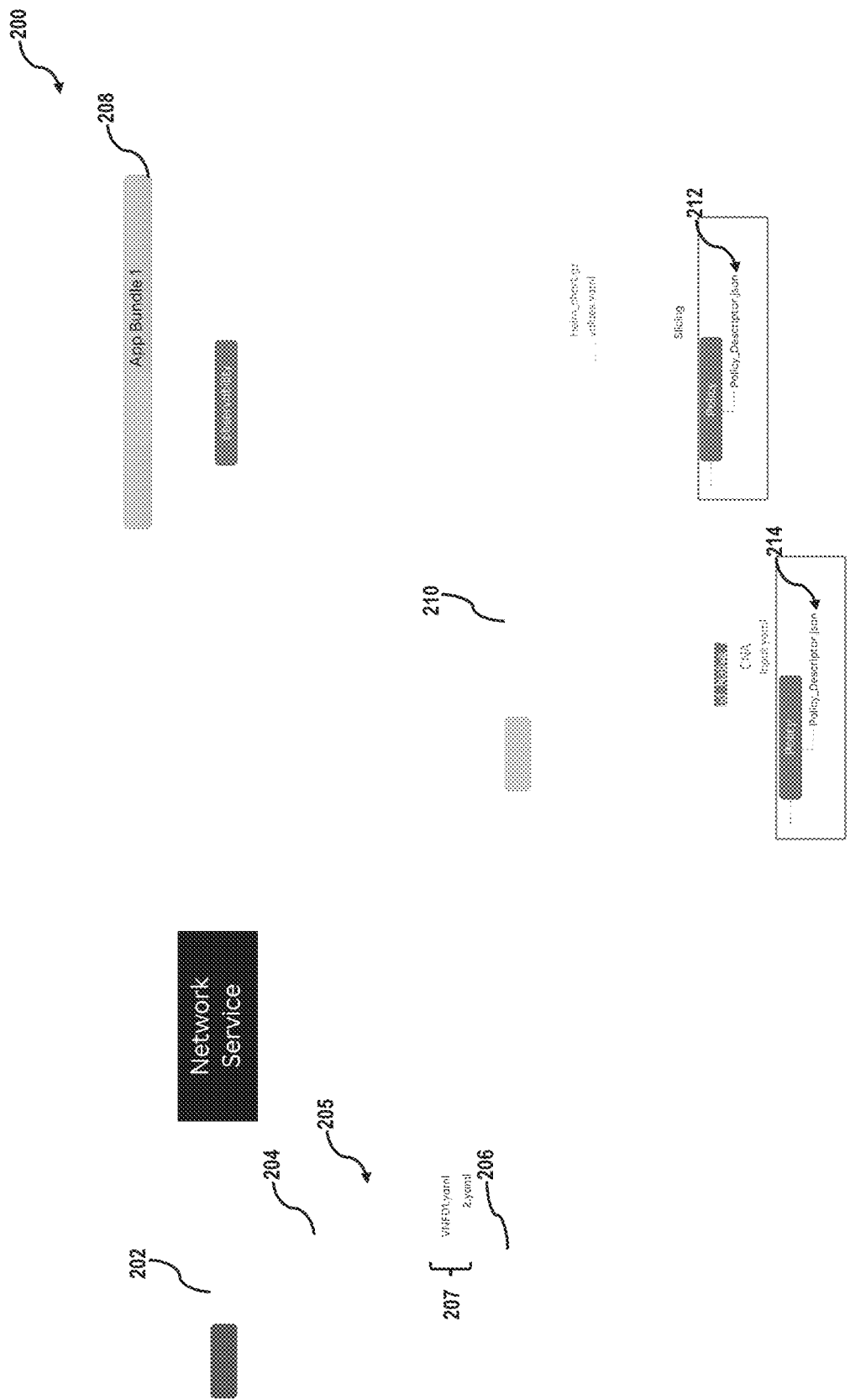
FIG. 2 is a pictorial representation of a universal network service (NS) bundle, in accordance with some embodiments.

FIG. 2 is a pictorial representation of a universal NS bundle 200, in accordance with some embodiments.

For purposes of this discussion, application and network function are used interchangeably unless otherwise distinguished from one another.

In FIG. 2, a NS bundle 202 is an amalgamation of technology services 204 (and other services like icons 206) which is further subdivided into different NSDs 205 and VNFDs 207. In some embodiments, VNFDs 207 are created with application bundles 208, 210. In some embodiments, a policy descriptor 212 and 214 is part of application bundles 208 and 210. In some embodiments, policy descriptor files 212 and 214 are of a json format. In some embodiments, the policy bundle is part of a network service (NS)/(NF) network function bundle which includes other artifacts such as technology application images, metrics, configuration files, or other suitable files within the scope of some embodiments.

JSON is an open standard file format and data interchange format that uses human-readable text to store and transmit data objects consisting of attribute-value pairs and arrays (or other serializable values). JSON is a data format with diverse uses in electronic data interchange, including that of web applications with servers. JSON is a language-independent data format. JSON was derived from JavaScript, but many modern programming languages include code to generate and parse JSON-format data. JSON filenames use the extension .json.

Figure 3:
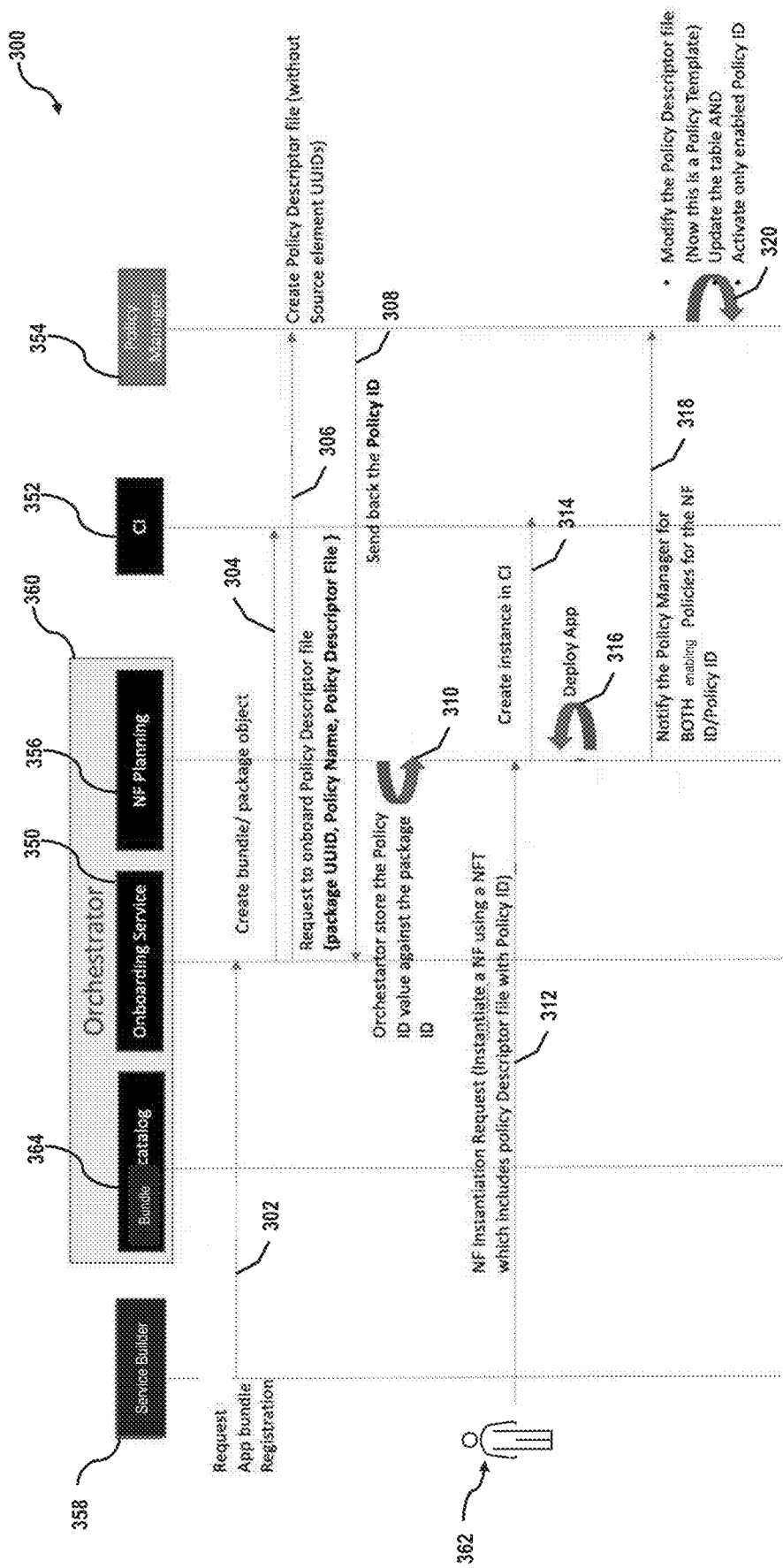
FIG. 3 is a data flow diagram of a method for policy onboarding unification, in accordance with some embodiments.

FIG. 3 is a data flow diagram of a method for policy onboarding unification 300, in accordance with some embodiments.

In some embodiments, method for policy onboarding unification 300 describes operations of unification of policy onboarding. While the operations of method for policy onboarding unification 300 are discussed and shown as having a particular order, each operation in method for policy onboarding unification 300 is configured to be performed in any order unless specifically called out otherwise. Method for policy onboarding unification 300 is implemented as a set of operations, such as operations 302 through 320.

At operation 302 of method for policy onboarding unification 300, service builder 358 registers an application bundle, such as application bundles 208 and 210, at bundle catalog 364 of orchestrator 360. In response to submission of the NF application, service builder tool 358 creates an application bundle and automatically registers the application bundle to bundle catalog 364 of orchestrator 360 via an application programming interface (API). A bundle is set of products that are offered under a single entitlement or license with no dedicated components. In bundle catalog 364, a bundle is modelled as a software product with setup relationships to the software products.

In some embodiments, service builder tool 358 is similar to service builder module 120 and includes references to NS bundles as the references are created by a slice manager. The slice manager is responsible for creating a network slice and NS subnet, whereas orchestrator 360 is responsible for creating NSs and NFs. Process flows from operation 302 to operation 304.

In some embodiments, method 300 describes a method for NS bundle creation and transportation. The slice manager takes care of a NS bundle for further execution of the bundle services to northbound systems (handle specific goals of a systematic operation). In some embodiments, method 300 describes a policy bundle which follows the same principle for bundle processing, with additional steps depicting how policy bundles are managed.

At operation 304 of method for policy onboarding unification 300, onboarding service 350 of orchestrator 360 creates bundle/package objects in the central inventory (CI) 352 and stores the bundle/package objects as inventory files. In some embodiments, an object is a variable, a data structure, a function, or a method. As regions of memory, the application bundle objects contain value and are referenced by identifiers. In some embodiments, an application bundle object is a combination of variables, functions, and data structures. In some embodiments, an application bundle object is a table or column, or an association between data and a database entity. Process flows from operation 304 to operation 306.

At operation 306 of method for policy onboarding unification 300, onboarding service 350 sends a request to policy manager 354 for creating the policy descriptor files (e.g., policy name, policy descriptor file (e.g., policy descriptor files 212 and 214), bundle/package UUID, but without source element UUIDs). In some embodiments, application bundle descriptor file is a JSON file (e.g., policy.descriptor.json) that describes the application bundle. The descriptor file includes general information for the application bundle, as well as the modules that the application bundle wants to use or extend. The descriptor file serves as the glue between the remote application (e.g., with user 362) and the application at a CN, such as CN 102. In some embodiments, when an administrator for a cloud instance installs an application, a descriptor file is installed, which contains pointers to a NS. Process flows from operation 306 to operation 308.

At operation 308 of method for policy onboarding unification 300, policy manager 354 returns the policy ID, corresponding to a rule-based policy and an application bundle, to orchestrator 360. Process flows from operation 308 to operation 310.

At operation 310 of method for policy onboarding unification 300, life cycle management (LCM) or network function (NF) planning module 356 stores the policy ID with the package ID. Application LCM is the product lifecycle management (e.g., governance, development, and maintenance) of computer programs. Life cycle encompasses requirements management, software architecture, computer programming, software testing, software maintenance, change management, continuous integration, project management, and release management. Process flows from operation 310 to operation 312.

At operation 312 of method for policy onboarding unification 300, a NF instantiation request (e.g., instantiate a NF using a NFT which includes policy descriptor file with Policy ID) from user 362 is received. Process flows from operation 312 to operation 314.

At operation 314 of method for policy onboarding unification 300, a NF instance is created in CI 352. In some embodiments, a user is instantiating/installing a NF for which the policy bundle has been created. The context of NF instantiation is included to relate that this NF is for policy creation. Process flows from operation 314 to operation 316.

At operation 316 of method for policy onboarding unification 300, orchestrator 360 deploys the NF/application for user 362. Process flows from operation 316 to operation 318.

At operation 318 of method for policy onboarding unification 300, orchestrator 360 sends notification to policy manager 354 to enable rule-based policies with respective policy IDs. Thus, as user 362 is using the application, rule-based policies are in effect for the application. Process flows from operation 318 to operation 320.

At operation 320 of method for policy onboarding unification 300, policy manager 354 modifies the policy files with pending (e.g., source element UUID and the like) information. After filling the pending information, the policy descriptor file becomes a policy template. A policy template table is updated and the enable policy ID is activated. In some embodiments, the template refers to a valid working policy file (i.e., a template is a name ecosystem terminology). A policy template is crated once a created policy has parameters to implement the policy.

Figure 4:
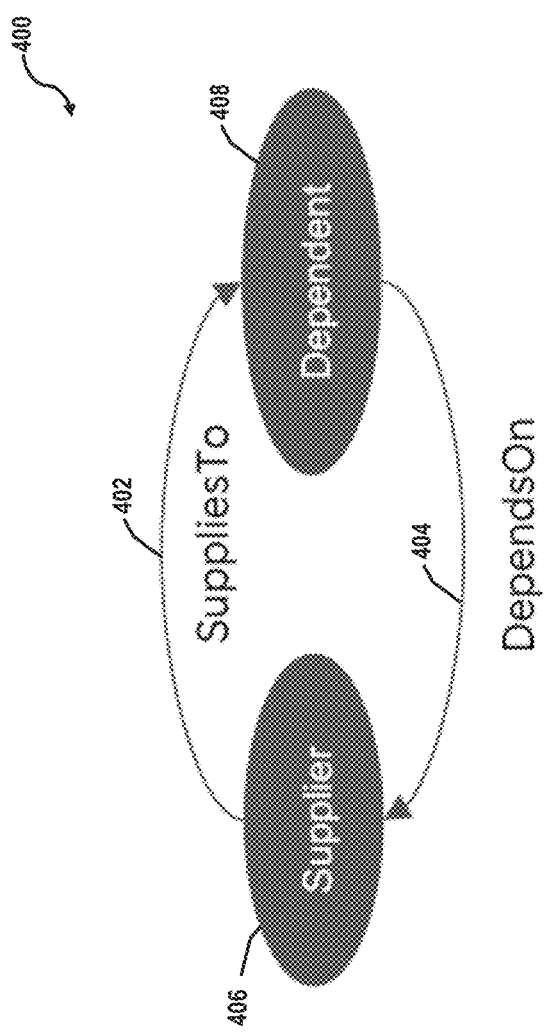
FIG. 4 is a data flow diagrammatic representation of a method for registration of a complimentary relationship between network service specifications, in accordance with some embodiments.

FIG. 4 is a data flow diagrammatic representation of a method for registration of a complimentary relationship 400 between network service specifications, in accordance with some embodiments.

Figure 5:
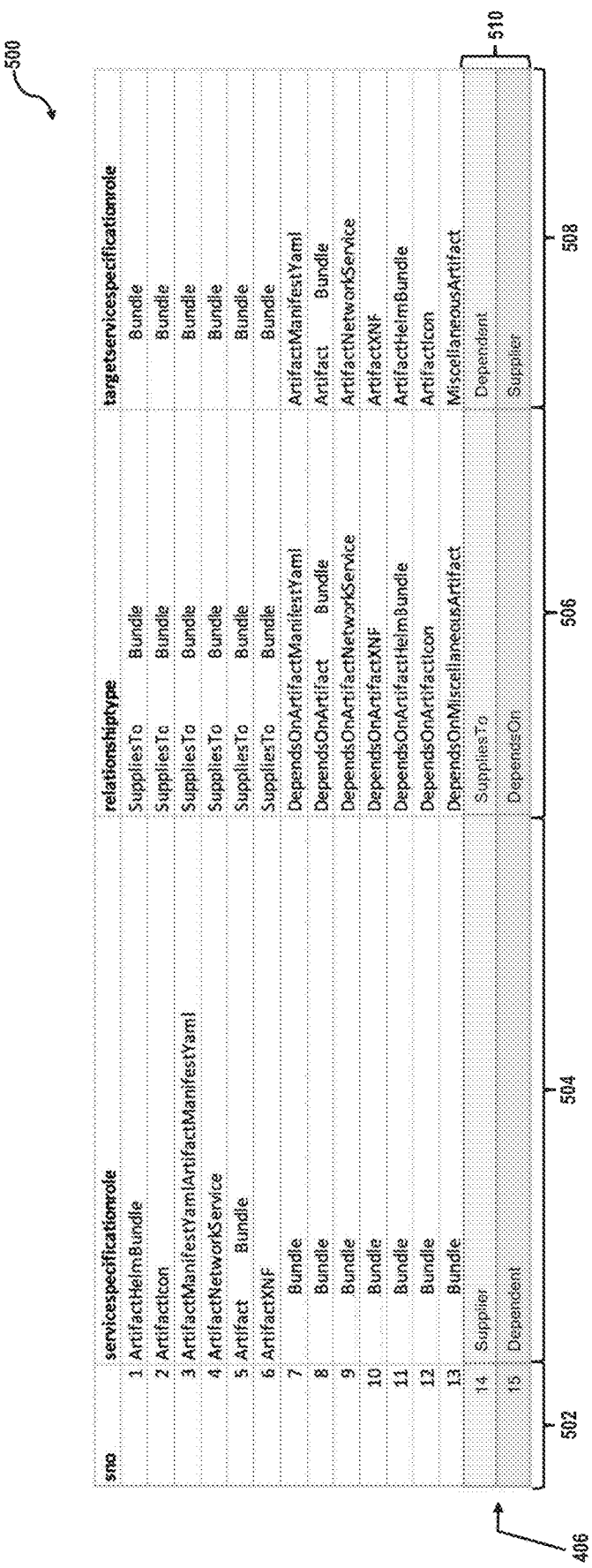
FIG. 5 is a pictorial representation of a relationship table between network service specifications, in accordance with some embodiments.

FIG. 5 is a pictorial representation of a complimentary relationship table 500 between network service specifications, in accordance with some embodiments.

Figure 6:
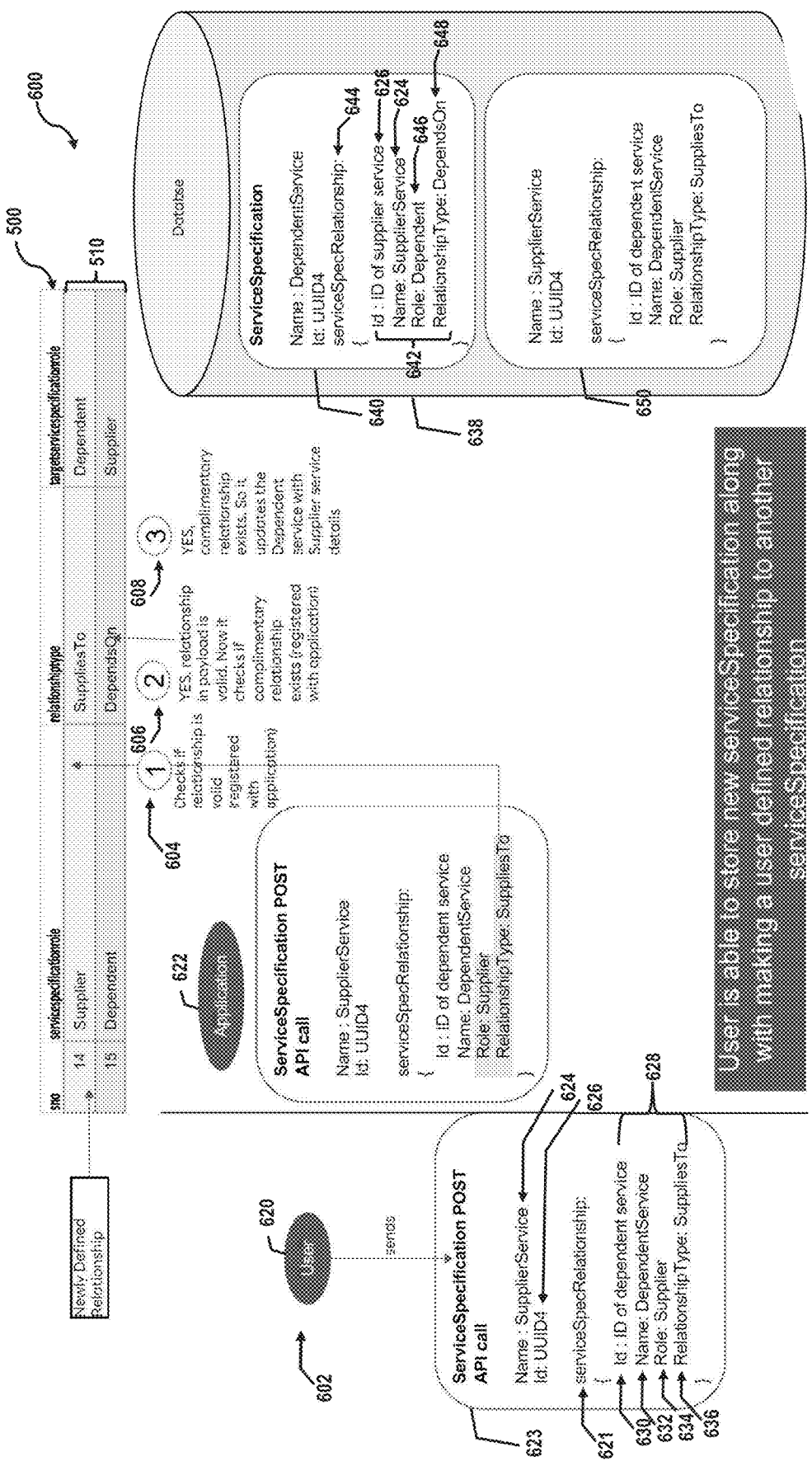
FIG. 6 is a data flow diagrammatic representation of a method for creation of custom relationships between service specifications (CCRBSS), in accordance with some embodiments.

FIG. 6 is a data flow diagrammatic representation of a method for creation of custom relationships between service specifications 600 (CCRBSS), in accordance with some embodiments.

FIGS. 4, 5, and 6 are discussed together to provide an understanding of method for registration of a complimentary relationship 400 and method for CCRBSS 600. In some embodiments, method for registration of a complimentary relationship 400 and method for CCRBSS 600 are executed by processing circuitry 802 discussed below with respect to FIG. 8. In some embodiments, some, or all the operations of method for registration of a complimentary relationship 400 and method for CCRBSS 600 are executed in accordance with instructions corresponding to instructions 806 discussed below with respect to FIG. 8.

Method for registration of a complimentary relationship 400 includes operations 402-406 and method for CCRBSS 600 includes operations 602-608, but the operations are not necessarily performed in the order shown. Operations are added, replaced, order changed, and/or eliminated as appropriate, in accordance with the spirit and scope of the embodiments. In some embodiments, one or more of the operations of method for registration of a complimentary relationship 400 and method for CCRBSS 600 are repeated. In some embodiments, unless specifically stated otherwise, the operations of method for registration of a complimentary relationship 400 and method for CCRBSS 600 are performed in order.

In other approaches, where a service specification (e.g., a NS specification) parent-child relationship exists, there is a problem with the existing standards and the existing implementations. That is multiple types of different artifacts are related to an application bundle, and in response to a user attempting to use a child artifact, (e.g., a deployment artifact), the user is unable to determine whether the second entity (e.g., the child service specification) is related to the first entity (e.g., the parent service specification). The user is unable to discover whether service specification B is dependent on service specification A from service specification B's artifact information.

Artifacts are separate documents constituting architecture. Artifacts provide descriptions from different perspectives for various actors. Artifacts are used for improving communication between different actors.

In some embodiments, a user creates a complementary relationship between a parent service specification 406 (e.g., supplier) and a child service specification 404 (e.g., dependent). In some embodiments, child service specification 404 depends on other parent service specifications as well. In some embodiments, a service catalog, such as service catalog 722 in FIG. 7, automatically adds the complementary relationship. In some embodiments, this complementary relationship creates a bi-directional relationship functionality.

In other approaches, where there are many diverse types of parent service specifications (e.g., parents), valid for different types of roles across different types of entities, and a user seeks to create a new (unilateral) relationship where a new type of entity has been added into a system, the standards don't describe how this action is to be performed. The standards allow for the freedom to describe the relationships, but no interface or mechanism to feed the relationships into a system and make sure the relationships are valid.

In some embodiments, an implementation provides for bi-directional relationships and unidirectional relationships. In some embodiments, a service catalog requests validation of bundle artifacts to allow the bundle artifact to be related in a relationship. In some embodiments, the service catalog does not accept a request from the user in response to a non-valid complimentary relationship. In this manner, the service catalog ensures that the integrity of the data is maintained and there are no random artifacts that are being associated with other artifacts. In a non-limiting example, in response to a third-party utilizing bundle information, the third-party's processes are not affected by incorrect mapping (e.g., incorrect relationships).

In some embodiments, users are allowed to define new relationships automatically, with a programmable interface (e.g., an API), without requesting manual addition of relationship values into a database. In some embodiments, communication between the user and teams that manually add these details is significantly reduced or eliminated. In some embodiments, a user adds validation on top of details that are being added programmatically, and in the future, expanded into the validation of unidirectional and bi-directional relationships. In some embodiments, bi-directional relationships utilize the validation to ensure that the bi-directional relationships are correctly mapped.

In other approaches, in response to having a parent (e.g., named A) and child (e.g., named B) the child was aware that the parent existed, but the parent was unaware that a child, named B, existed. This issue is exacerbated when there are multiple relationships. In a non-limiting example, in response to a relationship being created for a child and four parents, a separate new relationship with the child for each parent is created. Thus, multiple POST API network calls are made, and that becomes an additional effort in terms of integration. More failure points are introduced into all integrations. And, in response to those integrations failing information that is used to drive business flows are corrupted. Additionally, larger issues downstream are created.

In some embodiments, a relationship is the implementation of allowing the system to determine valid relationships. For example, service specification A has a relationship with service specification B and vice versa. Further, service specification A has this relationship. Another service specification, say service specification C, does not have the same type of relationship. Service specification C has a different relationship.

Figure 7:
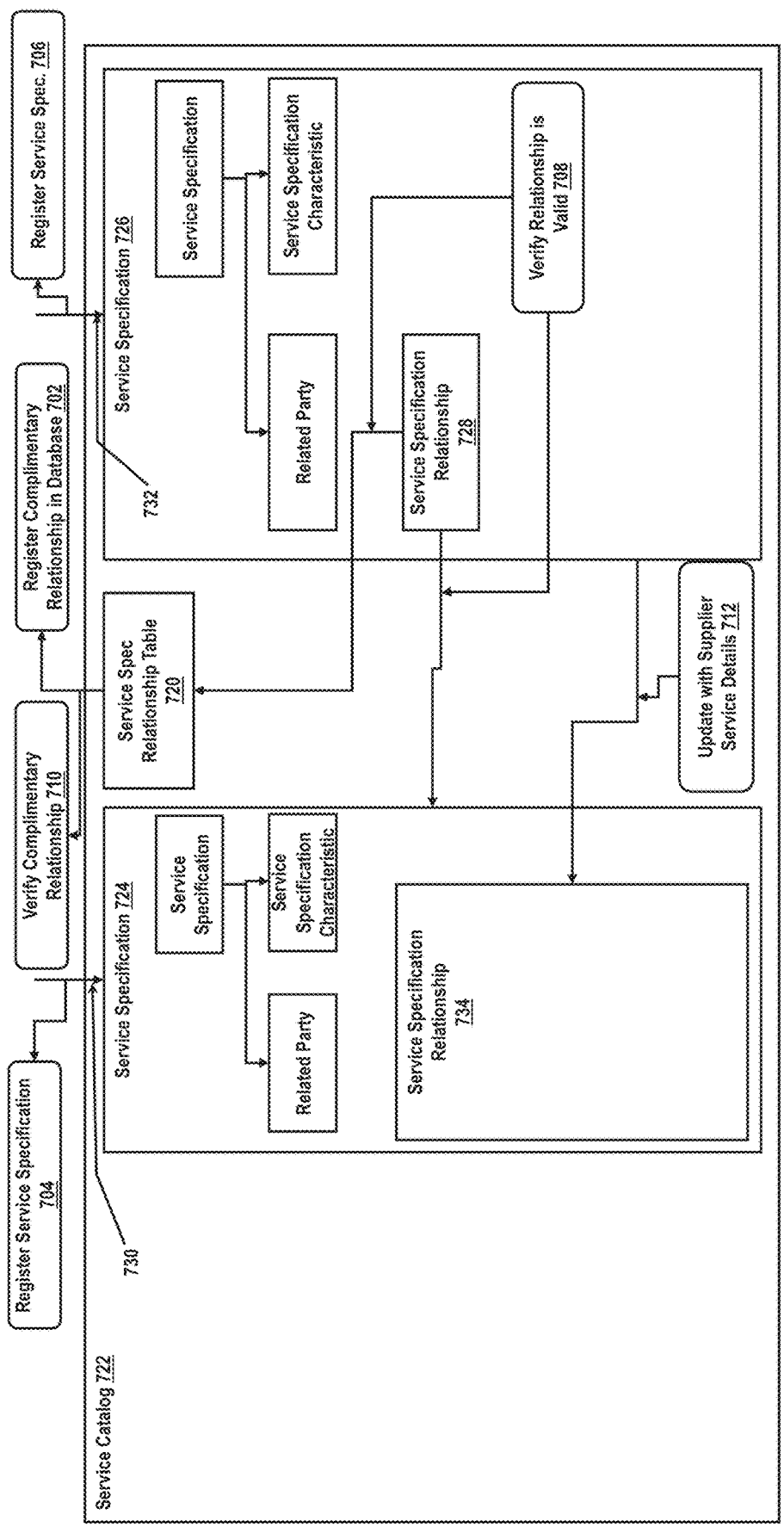
FIG. 7 is a pictorial representation of a method for CCRBSS, in accordance with some embodiments.

At operation 402 of method for registration of a complimentary relationship 400, a POST API call is made to a service catalog, such as service catalog 722 of FIG. 7, to register a first service specification with the service catalog and within relationship table 500 in FIG. 5. A service specification role, a relationship type and a target service specification role are described in the POST API call and stored in columns 504, 506, and 508, respectively. In a non-limiting example and with reference to FIG. 4 the POST API call includes:

```
{
  serviceSpecificationRole: Supplier (e.g., parent service specification 406)
  relationshipType: SuppliesTo
  targetServiceSpecificationRole: Dependent (e.g., child service specification 408)
}
```

Process flows from operation 402 to operation 404.

At operation 404 of method for registration of a complimentary relationship 400, a POST API call is made to register a second service specification with the service catalog and within relationship table 500 in FIG. 5. A service specification role, a relationship type and a target service specification role are described in the POST API call and stored in columns 504, 506, and 508, respectively. In a non-limiting example and with reference to FIG. 4 the POST API call includes:

```
{
  serviceSpecificationRole: Dependent (e.g., child service specification 408)
  relationshipType: DependsOn
  targetServiceSpecificationRole: Supplier (e.g., parent service specification 406)
}
```

Relationship table 500 includes column 502 that sequentially lists the serial numbers (SNO) for each service specification. In some embodiments, the SNOs are unlimited. In some embodiments, the SNOs are a number to quantify the total number of service specifications to include a complimentary relationship.

Relationship table 500 includes column 504 where each service specification role is described for each NS from column 502. In the example of FIG. 5, SNO 14 is a supplier as discussed and described above, while SNO 15 is dependent. In some embodiments, the supplier NS specification is configured to have a relationship with the dependent NS specification and vice versa.

Relationship table 500 includes column 506 where the relationship type is detailed for each service from column 502. In the example of FIG. 5, SNO 14, the "parent", supplies to SNO 15, and in complimentary fashion, the "child", depends on SNO 14.

Relationship table 500 includes column 508 where the target service specification role of complimentary relationship 510 is described. In the example of FIG. 5. SNO 14 has a target service specification role with dependent NS and SNO 15 has a target service specification role with the supplier NS.

Thus, from relationship table 500 complimentary relationship 510 between the supplier service specification (SNO 14) and the dependent service specification (SNO 15) is set forth. In some embodiments, relationship table 500 is created by a network operator or network engineer as laid out in operations 402 and 404. In some embodiments, complimentary relationship 510 is established during the design of a network slice. In some embodiments, relationship table 500 is stored with the service catalog, such as service catalog 722 of FIG. 7. In some embodiments, relationship 500 is stored within a database, such as database 638 in FIG. 6.

In computing, a database is an organized collection of data stored and accessed electronically. Small databases are stored on a file system, while large databases are hosted on computer clusters or cloud storage. The design of databases spans formal techniques and practical considerations, including data modelling, efficient data representation and storage, query languages, security and privacy of sensitive data, and distributed computing issues, including supporting concurrent access and fault tolerance.

In operation 602 of method for CCRBSS 600, user 620 sends a POST API call 623 describing service specification relationship 621 to register the service specification with the tele-management forum (TMF). User 620 has included name 624 for the NS (e.g., supplier service) and an ID 626 (e.g., a UUID4). Payload 628 includes an identification (ID) of the NS 630 in which a relationship is to be established. Payload 628 includes an ID 630 of dependent service, a name of the service specification 632 (e.g., dependent service), a service specification role 634 (e.g., supplier), and a service specification relationship type 636 (e.g., supplies to). In some embodiments, the service catalog is included in an orchestrator, such as orchestrator 360. Process flows from operation 602 to operation 604.

In operation 604 of method for CCRBSS 600, CCRBSS application 622 verifies whether payload 628 of service specification relationship 621 is valid. In some embodiments, CCRBSS application 622 is included in the service catalog, such as service catalog 722 in FIG. 7. In some embodiments, CCRBSS application 622 determines from relationship table 500 that the service specification role 634 in payload 628 is the same as the service specification role in column 504 for SNO 14. In a non-limiting example, service specification role 634 is located at SNO 14 column 504. In some embodiments, complimentary relationship 510 is registered with CCRBSS application 622. In some embodiments, CCRBSS application 622 compares service specification role 634 with the service specification role of SNO 14 column 504 and service specification relationship type 636 with relationship type of SNO 14 column 506. In some embodiments, CCRBSS application 622 then verifies the payload portions (i.e., service specification role 634 and service specification relationship type 636) match the information recorded in relationship table 500 columns 504 and 506 of SNO 14. In the non-limiting example of FIG. 6, the verification is true, and the process flows from operation 604 to operation 606. In some embodiments, in response to the verification being false, the relationship is not established and CCRBSS application 622 notifies user 620 a relationship does not exist within relationship table 500.

In operation 606 of method for CCRBSS 600, CCRBSS application 622 verifies complimentary relationship 510 is valid and in response to the verification being true, meaning the complimentary relationship 510 is registered with CCRBSS application 622. In some embodiments, CCRBSS application 622 determines whether the relationship type of column 506 of SNO 15 (e.g., depends on) and target service specification role of column 508 of SNO 15 (e.g., supplier) correlates with the service specification role of column 504 of SNO 14 and target service specification role of column 508 of SNO 14. In response to the verification being true, then a valid relationship exists process flows from operation 606 to operation 608. In some embodiments, in response to the verification being false, CCRBSS application 622 notifies user 620 a complimentary relationship does not exist within relationship table 500.

In operation 608 of method for CCRBSS 600, in response to complimentary relationship 510 existing, CCRBSS application 622 updates dependent service specification 640, stored in database 638. In some embodiments, dependent service specification 640 was stored in database 638 when dependent service specification was created as a NS for a network such as RAN 104. Payload 642 of service specification relationship 644 is updated to include ID 626 and name of service specification 624 of POST API call 623. Role 646 is taken from relationship table 500 column 504 of SNO 15 (e.g., dependent) along with relationship type 648 which is taken from relationship table 500 column 506 of SNO 15. Process flows from operation 608 to operation 610.

In operation 610 of method for CCRBSS 600, new service specification 650, described in POST API call 623, describing the complimentary relationship with service specification 640 is stored in database 638.

FIG. 7 is a pictorial representation of a method for creation of custom relationships between service specifications 700 (CCRBSS), in accordance with some embodiments.

FIG. 7 is discussed to provide an understanding of a method for CCRBSS 700. In some embodiments, method for CCRBSS 700 is similar to method for CCRBSS 600. In some embodiments, method for CCRBSS 700 is executed by processing circuitry 802 discussed below with respect to FIG. 8. In some embodiments, some, or all the operations of method for CCRBSS 700 are executed in accordance with instructions corresponding to instructions 806 discussed below with respect to FIG. 8.

Method for CCRBSS 700 includes operations 702-712, but the operations are not necessarily performed in the order shown. Operations are added, replaced, order changed, and/or eliminated as appropriate, in accordance with the spirit and scope of the embodiments. In some embodiments, one or more of the operations of method for CCRBSS 700 are repeated. In some embodiments, unless specifically stated otherwise, the operations of method for CCRBSS 700 are performed in order.

At operation 702 of method for CCRBSS 700, service catalog 722 registers a user-defined relationship in a database, such as database 638. In some embodiments, a user-defined relationship is between service specifications. In some embodiments, service catalog 722 stores table 720 or a copy of table 720 in a database, such as database 638. In some embodiments, a relationship, such as relationship 510, is created by a user, such as user 620. In some embodiments, service specification relationship table 720 is like relationship table 500. In FIG. 7, service specification relationship data table 720 is located within service catalog 722. In some embodiments, service catalog 722 is a TMF633 service catalog. In some embodiments, TMF633 is a catalog API, representing the functionality of defining services and their capabilities. In some embodiments, service catalog 722 is a TMF service catalog API where the service catalog management API allows for the management of the entire lifecycle of service catalog elements. Process flows from operation 702 to operation 704

At operation 704 of method for CCRBSS 700, service catalog 722 registers service specification 724 (e.g., for a dependent service). In some embodiments, the service specification being registered is the dependent service of SNO 15. In some embodiments, service specification 724 is registered with the TMF in a Representational state transfer (REST) API call 730.

REST is a software architectural style that describes a uniform interface between physically separate components, often across the Internet in a client-server architecture. Generally, REST describes a machine-to-machine interface. In web development REST allows content to be rendered when the content is requested, often referred to as dynamic content. Process flows from operation 704 to operation 706.

At operation 706 of method for CCRBSS 700, service catalog 722 registers service specification 726 (e.g., for a supplier service). In some embodiments, the service specification being registered is the supplier service of SNO 14. In some embodiments, service specification 726 is registered with the TMF. In some embodiments, API call 732 is a Representational state transfer (REST) API call from the TMF. Process flows from operation 706 to operation 708.

At operation 708 of method for CCRBSS 700, service catalog 722 determines whether the relationship within service specification relationship 728 of service specification 726 is valid (e.g., registered with service catalog 722). Process flows from operation 708 to operation 710.

At operation 710 of method for CCRBSS 700, in response to a valid relationship between the payload in service specification relationship 728 and relationship table 720, a determination is made as to whether a complimentary relationship exists between service specification 726 and service specification 724 in relationship table 720 (e.g., registered with service catalog 722). Process flows from operation 710 to operation 712.

At operation 712 of ABMBSS method 700, in response to a complimentary relationship existing, a service specification relationship 734 is updated to include a payload including service specification details from service specification 726 and service specification relationship 728. In some embodiments, service specification relationship 728 is updated with payload detail regarding service specification 724 and service specification relationship 734.

Figure 8:
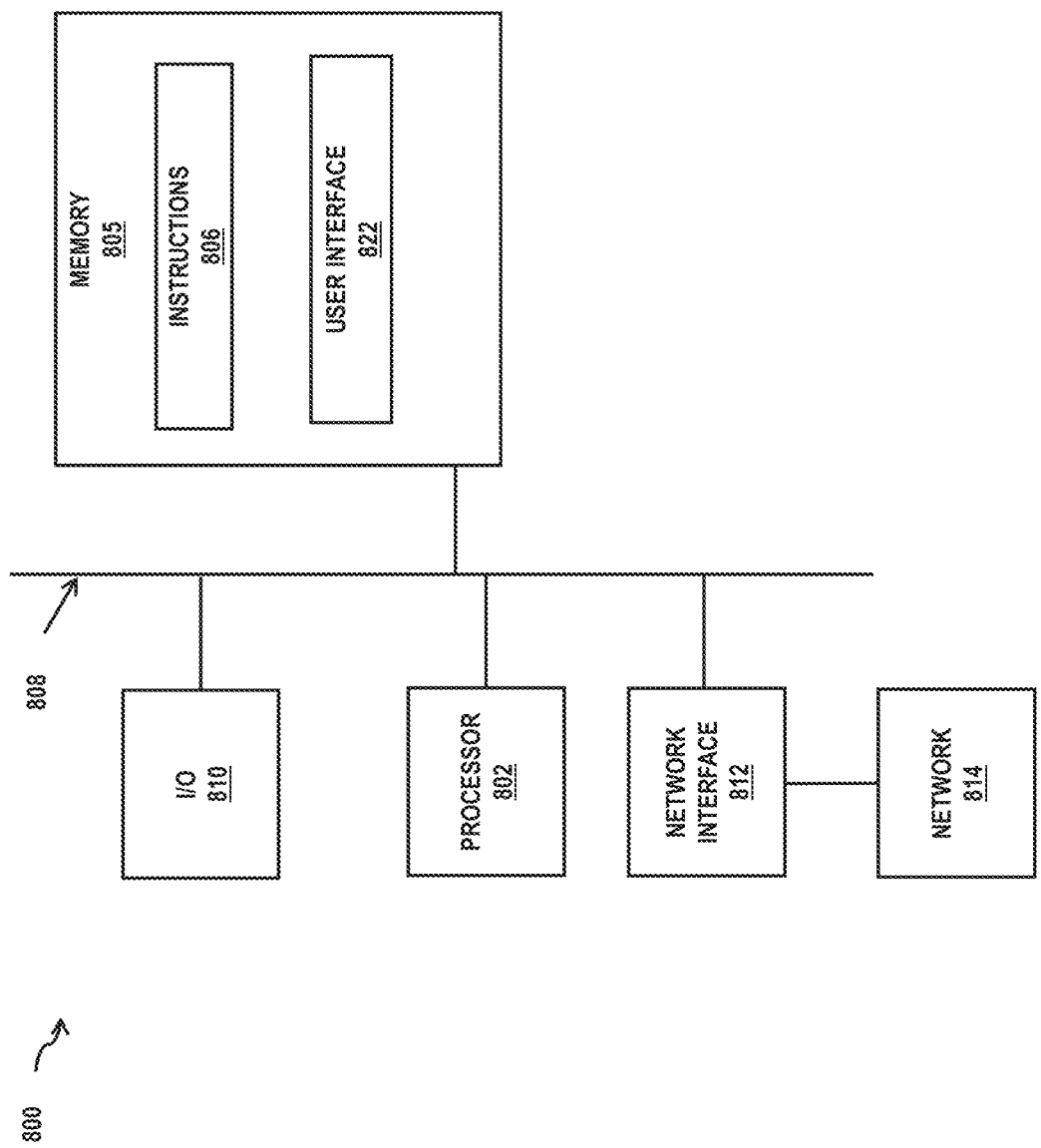
FIG. 8 is a high-level functional block diagram of a processor-based system, in accordance with some embodiments.

FIG. 8 is a block diagram of creation of custom relationships between service specifications (CCRBSS) processing circuitry 800 in accordance with some embodiments. In some embodiments, CCRBSS processing circuitry 800 is a general-purpose computing device including a hardware processor 802 and a non-transitory, computer-readable storage medium 804. Storage medium 804, amongst other things, is encoded with, i.e., stores, computer program code 806, i.e., a set of executable instructions such as an algorithm, or methods 300, 400 and 600. Execution of instructions 806 by hardware processor 802 represents (at least in part) a creation of custom relationships between service specifications application which implements a portion, or all the methods described herein in accordance with one or more embodiments (hereinafter, the noted processes and/or methods).

Processor 802 is electrically coupled to a computer-readable storage medium 804 via a bus 808. Processor 802 is further electrically coupled to an I/O interface 810 by bus 808. A network interface 812 is further electrically connected to processor 802 via bus 808. Network interface 812 is connected to a network 814, so that processor 802 and computer-readable storage medium 804 connect to external elements via network 814. Processor 802 is configured to execute computer program code 806 encoded in computer-readable storage medium 804 to cause CCRBSS processing circuitry 800 to be usable for performing a portion or all the noted processes and/or methods. In one or more embodiments, processor 802 is a central processing unit (CPU), a multi-processor, a distributed processing system, an application specific integrated circuit (ASIC), and/or a suitable processing unit.

In one or more embodiments, computer-readable storage medium 804 is an electronic, magnetic, optical, electromagnetic, infrared, and/or a semiconductor system (or apparatus or device). For example, computer-readable storage medium 804 includes a semiconductor or solid-state memory, a magnetic tape, a removable computer diskette, a random-access memory (RAM), a read-only memory (ROM), a rigid magnetic disk, and/or an optical disk. In one or more embodiments using optical disks, computer-readable storage medium 804 includes a compact disk-read only memory (CD-ROM), a compact disk-read/write (CD-R/W), and/or a digital video disc (DVD).

In one or more embodiments, storage medium 804 stores computer program code 806 configured to cause CCRBSS processing circuitry 800 to be usable for performing a portion or all the noted processes and/or methods. In one or more embodiments, storage medium 804 further stores information, such as an algorithm which facilitates performing a portion or all the noted processes and/or methods.

CCRBSS processing circuitry 800 includes I/O interface 810. I/O interface 810 is coupled to external circuitry. In one or more embodiments, I/O interface 810 includes a keyboard, keypad, mouse, trackball, trackpad, touchscreen, and/or cursor direction keys for communicating information and commands to processor 802.

CCRBSS processing circuitry 800 further includes network interface 812 coupled to processor 802. Network interface 812 allows CCRBSS processing circuitry 800 to communicate with network 814, to which one or more other computer systems are connected. Network interface 812 includes wireless network interfaces such as BLUETOOTH, WIFI, WIMAX, GPRS, or WCDMA; or wired network interfaces such as ETHERNET, USB, or IEEE-864. In one or more embodiments, a portion or all noted processes and/or methods, is implemented in two or more CCRBSS processing circuitry 800.

CCRBSS processing circuitry 800 is configured to receive information through I/O interface 810. The information received through I/O interface 810 includes one or more of instructions, data, design rules, and/or other parameters for processing by processor 802. The information is transferred to processor 802 via bus 808. CCRBSS processing circuitry 800 is configured to receive information related to UI 822 through I/O interface 810. The information is stored in computer-readable medium 804 as user interface (UI) 822.

In some embodiments, a portion or all the noted processes and/or methods is implemented as a standalone software application for execution by a processor. In some embodiments, a portion or all the noted processes and/or methods is implemented as a software application that is a part of an additional software application. In some embodiments, a portion or all the noted processes and/or methods is implemented as a plug-in to a software application.

In some embodiments, a method includes receiving, by a processor, a unilateral relationship between a first service specification and a second service specification; receiving, by the processor, a complimentary relationship between the second service specification and the first service specification; storing, by the processor, each relationship in a relationship table included in a service catalog; receiving, by the processor, a payload corresponding to the first service specification, where the payload includes a service specification relationship with the second service specification; verifying, by the processor, the service specification relationship in the payload correlates with the unilateral relationship stored in the relationship table; in response to the service specification relationship in the payload correlating with the unilateral relationship stored in the relationship table, verifying, by the processor, whether the complimentary relationship exists in the relationship table; and in response to the complimentary relationship existing in the relationship table, updating automatically, by the processor, a service corresponding to the second service specification with a service specification relationship with the first service specification.

In some embodiments, the receiving the unilateral relationship between the first service specification and the second service specification includes receiving, by the processor, a first application programming interface (API) call corresponding to the unilateral relationship.

In some embodiments, the receiving the complimentary relationship between the second service specification and the first service specification includes receiving, by the processor, a second API call corresponding to the complimentary relationship.

In some embodiments, the method further includes storing, by the processor, the relationship table in a database.

In some embodiments, the receiving the payload corresponding to the first service specification includes receiving, by the processor, one or more of a second service specification identification (ID); a second service specification name; a first service specification role; or a first service specification relationship type.

In some embodiments, the verifying the service specification relationship in the payload correlates with the unilateral relationship stored in the relationship table includes comparing, by the processor, one or more of the first service specification role with a service specification role in the relationship table for the first service specification; or the first service specification relationship type with a relationship type in the relationship table for the first service specification.

In some embodiments, the method further includes storing, by the processor, the second service specification with the automatic update corresponding to the first service specification in a database.

In some embodiments, the method further incudes storing, by the processor, the first service specification with the payload that includes the service specification relationship with the second service specification in the database.

In some embodiments, an apparatus incudes a processor; and a memory having instructions stored thereon that, in response to being executed by the processor, cause the apparatus to receive a unilateral relationship between a first service specification and a second service specification; receive a complimentary relationship between the second service specification and the first service specification; store each relationship in a relationship table included in a service catalog; receive, from a user, a payload corresponding to the first service specification, where the payload includes a service specification relationship with the second service specification; verify, by an application, the service specification relationship in the payload correlates with the unilateral relationship stored in the relationship table; in response to the service specification relationship in the payload correlating to the unilateral relationship stored in the relationship table, verify, by the application, whether the complimentary relationship exists in the relationship table; and in response to the complimentary relationship existing in the relationship table, automatically update a service corresponding to the second service specification with the service specification relationship with the first service specification.

In some embodiments, the apparatus is caused to receive the unilateral relationship between the first service specification and the second service specification by receiving a first application programming interface (API) call corresponding to the unilateral relationship.

In some embodiments, the apparatus is caused to receive the complimentary relationship between the second service specification and the first service specification by receiving a second API call corresponding to the complimentary relationship.

In some embodiments, the apparatus is further caused to store the relationship table in a database.

In some embodiments, the apparatus is caused to receive the payload corresponding to the first service specification by receiving one or more of a second service specification identification (ID); a second service specification name; a first service specification role; or a first service specification relationship type.

In some embodiments, the apparatus is caused to verify the service specification relationship in the payload correlates with the unilateral relationship stored in the relationship table by comparing one or more of the first service specification role with a service specification role in the relationship table for the first service specification; or the first service specification relationship type with a relationship type in the relationship table for the first service specification.

In some embodiments, the apparatus is further caused to store the second service specification with the automatic update corresponding to the first service specification in a database.

In some embodiments, the apparatus is further caused to store the first service specification with the payload that includes the service specification relationship with the second service specification in the database.

In some embodiments, a non-transitory computer readable medium having instructions stored thereon that, in response to being executed by a processor, cause an apparatus to receive a unilateral relationship between a first service specification and a second service specification; receive a complimentary relationship between the second service specification and the first service specification; store each relationship in a relationship table included in a service catalog; receive a payload corresponding to the first service specification, where the payload includes a service specification relationship with the second service specification; verify the service specification relationship in the payload correlates with the unilateral relationship; in response to the service specification relationship in the payload correlating with the unilateral relationship stored in the relationship table, verify whether the complimentary relationship between exists in the relationship table; and in response to the complimentary relationship existing in the relationship table, automatically update a service corresponding to the second service specification with the service specification relationship with the first service specification.

In some embodiments, the apparatus is caused to receive the unilateral relationship between the first service specification and the second service specification by receiving a first application programming interface (API) call corresponding to the unilateral relationship.

In some embodiments, the apparatus is caused to receive the complimentary relationship between the second service specification and the first service specification by receiving a second API call corresponding to the complimentary relationship.

In some embodiments, the apparatus is further caused to store the relationship table in a database.

The foregoing outlines features of several embodiments so that those skilled in the art better understand the aspects of the present disclosure. Those skilled in the art should appreciate that they readily use the present disclosure as a basis for designing or modifying other processes and structures for conducting the same purposes and/or achieving the same advantages of the embodiments introduced herein. Those skilled in the art should further realize that such equivalent constructions do not depart from the spirit and scope of the present disclosure, and that they make various changes, substitutions, and alterations herein without departing from the spirit and scope of the present disclosure.

What is claimed is:

1. A method, comprising:
    receiving, by a processor, a unilateral relationship between a first service specification and a second service specification;
    receiving, by the processor, a complimentary relationship between the second service specification and the first service specification;
    storing, by the processor, each relationship in a relationship table included in a service catalog;
    receiving, by the processor, a payload corresponding to the first service specification, where the payload includes a service specification relationship with the second service specification;
    verifying, by the processor, the service specification relationship in the payload correlates with the unilateral relationship stored in the relationship table;
    in response to the service specification relationship in the payload correlating with the unilateral relationship stored in the relationship table, verifying, by the processor, whether the complimentary relationship exists in the relationship table; and
    in response to the complimentary relationship existing in the relationship table, updating automatically, by the processor, a service corresponding to the second service specification with a service specification relationship with the first service specification.

2. The method of claim 1, wherein:
    the receiving the unilateral relationship between the first service specification and the second service specification comprises:
    receiving, by the processor, a first application programming interface (API) call corresponding to the unilateral relationship.

3. The method of claim 2, wherein:
    the receiving the complimentary relationship between the second service specification and the first service specification comprises:
    receiving, by the processor, a second API call corresponding to the complimentary relationship.

4. The method of claim 1, further comprising:
    storing, by the processor, the relationship table in a database.

5. The method of claim 1, wherein:
the receiving the payload corresponding to the first service specification comprises:
receiving, by the processor, one or more of:
a second service specification identification (ID);
a second service specification name;
a first service specification role; or
a first service specification relationship type.

6. The method of claim 5, wherein:
the verifying the service specification relationship in the payload correlates with the unilateral relationship stored in the relationship table comprises:
comparing, by the processor, one or more of:
the first service specification role with a service specification role in the relationship table for the first service specification; or
the first service specification relationship type with a relationship type in the relationship table for the first service specification.

7. The method of claim 1, further comprising:
storing, by the processor, the second service specification with the automatic update corresponding to the first service specification in a database.

8. The method of claim 7, further comprising:
storing, by the processor, the first service specification with the payload that includes the service specification relationship with the second service specification in the database.

9. An apparatus, comprising:
a processor; and
a memory having instructions stored thereon that, in response to being executed by the processor, cause the apparatus to:
receive a unilateral relationship between a first service specification and a second service specification;
receive a complimentary relationship between the second service specification and the first service specification;
store each relationship in a relationship table included in a service catalog;
receive, from a user, a payload corresponding to the first service specification, where the payload includes a service specification relationship with the second service specification;
verify, by an application, the service specification relationship in the payload correlates with the unilateral relationship stored in the relationship table;
in response to the service specification relationship in the payload correlating to the unilateral relationship stored in the relationship table, verify, by the application, whether the complimentary relationship exists in the relationship table; and
in response to the complimentary relationship existing in the relationship table, automatically update a service corresponding to the second service specification with the service specification relationship with the first service specification.

10. The apparatus of claim 9, wherein the apparatus is caused to receive the unilateral relationship between the first service specification and the second service specification by:
receiving a first application programming interface (API) call corresponding to the unilateral relationship.

11. The apparatus of claim 10, wherein the apparatus is caused to receive the complimentary relationship between the second service specification and the first service specification by:
receiving a second API call corresponding to the complimentary relationship.

12. The apparatus of claim 9, wherein the apparatus is further caused to:
store the relationship table in a database.

13. The apparatus of claim 9, wherein the apparatus is caused to receive the payload corresponding to the first service specification by:
receiving one or more of:
a second service specification identification (ID);
a second service specification name;
a first service specification role; or
a first service specification relationship type.

14. The apparatus of claim 13, wherein the apparatus is caused to verify the service specification relationship in the payload correlates with the unilateral relationship stored in the relationship table by:
comparing one or more of:
the first service specification role with a service specification role in the relationship table for the first service specification; or
the first service specification relationship type with a relationship type in the relationship table for the first service specification.

15. The apparatus of claim 9, wherein the apparatus is further caused to:
store the second service specification with the automatic update corresponding to the first service specification in a database.

16. The apparatus of claim 15, wherein the apparatus is further caused to:
store the first service specification with the payload that includes the service specification relationship with the second service specification in the database.

17. A non-transitory computer readable medium having instructions stored thereon that, in response to being executed by a processor, cause an apparatus to:
receive a unilateral relationship between a first service specification and a second service specification;
receive a complimentary relationship between the second service specification and the first service specification;
store each relationship in a relationship table included in a service catalog;
receive a payload corresponding to the first service specification, where the payload includes a service specification relationship with the second service specification;
verify the service specification relationship in the payload correlates with the unilateral relationship;
in response to the service specification relationship in the payload correlating with the unilateral relationship stored in the relationship table, verify whether the complimentary relationship between exists in the relationship table; and
in response to the complimentary relationship existing in the relationship table, automatically update a service corresponding to the second service specification with the service specification relationship with the first service specification.

18. The non-transitory computer readable medium of claim 17, wherein the apparatus is caused to receive the unilateral relationship between the first service specification and the second service specification by:
receiving a first application programming interface (API) call corresponding to the unilateral relationship.

19. The non-transitory computer readable medium of claim 18, wherein the apparatus is caused to receive the complimentary relationship between the second service specification and the first service specification by:
receiving a second API call corresponding to the complementary relationship.

20. The non-transitory computer readable medium of claim 17, wherein the apparatus is further caused to:
store the relationship table in a database.

* * * * *